United States Patent Office 3,442,875
Patented May 6, 1969

3,442,875
MONOEPOXIDE POLYMERS
Irving Kuntz, Westfield, N.J., assignor to Esso Research and Engineering Company, a corporation of Delaware
No Drawing. Filed Jan. 19, 1966, Ser. No. 521,515
Int. Cl. C08g 23/06, 23/14
U.S. Cl. 260—79.5                                      6 Claims

ABSTRACT OF THE DISCLOSURE

Sulfur-curable copolymers of tetrahydrofuran with an alicyclic olefin monoepoxide, e.g. cyclododecadiene monoepoxide, are prepared by copolymerizing the monomers in the presence of a di- or tri-arylmethyl carbonium ion salt catalyst, e.g. tri-phenylmethyl hexachloroantimonate.

---

This invention relates to new polymers of monoepoxides and a method for their preparation. More particularly, this invention is directed to copolymers of tetrahydrofuran with alicyclic olefinic monoepoxides and to a method for their preparation.

Various copolymers of monoepoxides such as tetrahydrofuran (tetramethyleneoxide) with other materials have been reported as being prepared with various types of polymerization initiators. Meerwein, in German Patent No. 914,438, found that copolymers of tetrahydrofuran with ethylene oxide could be prepared utilizing boron trifluoride or antimony trichloride but not aluminum chloride or zinc chloride as polymerization initiators. Most of the polymers described as being formed with the catalyst systems of the prior art are characterized as being mobile or viscous liquids. Moreover, such copolymers are disadvantageous since they contain no residual olefinic unsaturation and hence do not lend themselves to inexpensive sulfur vulcanization.

Now in accordance with this invention, polymer products capable of a wide variation in form and utility are prepared by polymerizing tetrahydrofuran with an alicyclic olefinic monoepoxide. The polymerization is conveniently conducted at relatively low temperatures and at mild pressures in the presence of aromatic diluents or in bulk with a mono or bis di- or tri-aryl methyl carbonium ion salt catalyst. Depending upon the proportions of monomers and catalyst in the polymerization operation, the products of this invention may be elastomers which can be vulcanized with sulfur and accelerators, surface coatings which may be applied from a solvent vehicle to form crosslinked films on air drying, or thermoplastic compositions.

The polymers encompassed by this invention include copolymers and terpolymers containing (a) 60 to 99 mole percent, preferably 90 to 99 mole percent, tetrahydrofuran residues and (b) 40 to 1 mole percent, preferably 10 to 1 mole percent, of residues of an alicyclic olefinic monoepoxide or 40 to 1 mole percent, preferably 10 to 1 mole percent, of residues of an alicyclic olefinic monoepoxide and 0 to 39 mole percent, preferably 0 to 30 mole percent, of a saturated epoxide of the 1,2 or 1,3 or 1,4-type having 3 or more carbon atoms.

The term "alicyclic olefinic monoepoxide" refers to those monoepoxides derived from the monoepoxidation of alicyclic di- or tri-olefins so that the resultant alicyclic monoepoxides will contain one epoxide group and at least one double bond in the molecule. Suitable examples of alicyclic olefinic monoepoxides (which preferably contain a fused ring) include dicyclopentadiene monoepoxide tetrahydroindene monoepoxide, etc. Particularly preferred is an alicyclic olefinic monoepoxide having one epoxide group and two double bonds in the molecule, e.g. 1,2-epoxy-5,6-trans-9,10-cis-cyclododecadiene (hereinafter called cyclododecadiene monoepoxide.

The saturated monoepoxides are those having one epoxide group and no vinyl-type double bonds in the molecule; suitable examples of saturated monoepoxides include propylene oxide, epichlorohydrin, 3,3'-bis-(chloromethyl)oxacyclobutane, isobutylene oxide, styrene oxide, etc.

The monoepoxides used in this invention may be prepared by well-known method such as the monoepoxidation of mono-, di-, or tri-olefinic hydrocarbons or ethers, or by condensation of functionally substituted epoxides with appropriately substituted reactants.

The novel polymers of the present invention have the advantage of rapid vulcanization with economical sulfur-type curing systems or they may be cured by oxidation procedures such as air drying; these advantages result from the residual olefinic (i.e. vinyl-type) unsaturation introduced in the polymer molecule via the alicyclic olefinic monoepoxide.

The polymers may be readily prepared in the absence of any solvent, i.e. in an excess of tetrahydrofuran; alternatively, solvent polymerization techniques may be used. Aromatic hydrocarbons that are liquid at the conditions of temperature and pressure used in the polymerization reaction are preferred for use in the process of this invention. Representative examples of suitable solvents include benzene, toluene, ethylbenzene, xylene, nitrobenzene, and the like. Mixtures of aromatic solvents with alicyclic solvents, for example toluene and cyclohexane, may be used. Halogenated materials such as methyl chloride or methylene chloride should be avoided.

The catalyst system employed in preparing the polymers of this invention comprises at least one di- or tri-arylmethyl carbonium ion salt. Mono or bis carbonium ion salts are effective catalysts. The general structure of the desired carbonium ion salt may be represented by the following formula:

$$[X_zMCH_yAr_x]_n-R'-[Ar_xCH_yMX_z]$$

wherein Ar is a phenyl or naphthyl group or an alkyl-substituted phenyl or naphthyl group. Each of the Ar groups may be the same or a different aromatic moiety. M in the above formula is a cation such as zinc, boron, aluminum, gallium, tin, titanium, zirconium, antimony, vanadium, iron, etc. X represents the anion of a halogen having an atomic number of less than 53, i.e. fluorine, chlorine or bromine. The symbol $x$ represents the interger of 2 or 3 and the sum of $x$ and $y$ must be equal to the integer 3. The symbol $z$ has a value equal to the sum of 1 plus the highest valence of the cation M. The symbol $n$ represents the integer 0 or 1. When $n$ is 0, R' must be hydrogen; when $n$ is 1, R' may be a $C_6$–$C_{16}$ aryl radical such as phenyl, tolyl, xylyl, naphthyl, etc. or R' may be a radical represented by the formula $$(CH_2)_a-(O)_b-(CH_2)_c$$

wherein $a$ is an integer of 0 to 5, $b$ is the integer 0 or 1 and $c$ is an integer of 0 to 5 such as ethylene, butylene, dimethyl ether radical, etc.

Representative examples of useful catalysts include triphenylmethyl hexachloroantimonate, triphenylmethyl hexafluoroantimonate, triphenylmethyl tetrachloroaluminate, triphenylmethyl pentachlorostannate, triphenylmethyl tetrachloroborate, triphenylmethyl tetrafluoroborate, triphenylmethyl diethyl dichloroaluminate, triphenylmethylchloro-trifluoroborate, triphenylmethyl - bromopentachloroantimonate, diphenylmethyl hexachloroantimonate, bis[4,4' - diphenylmethyl]bibenzyl - bis(hexachloroantimonate), etc. The preferred aryl group in the catalyst is a phenyl radical and the preferred cation is antimony. The most preferred catalyst is triphenylmethyl hexachloroantimonate. The total amount of catalyst employed in the polymerization reaction varies with the choice of monomers to be polymerized and the choice of components of the catalyst system, but is generally in the range of from about 0.005 to about 2.0 moles, preferably 0.01 to 1.0 mole, per 100 moles of the total monomer feed.

The conditions at which the polymerization reaction is conducted can vary over a wide range. Generally, temperatures ranging from −80° to 50° C. can be used; however, temperatures ranging from −30° to 30° C. are preferred. The pressure at which the polymerization is carried out is not critical and pressures ranging from 0.2 to 1000 p.s.i.g. can be employed in the polymerization reaction. Pressures in the range of from about 1 atmosphere to 10 atmospheres are most generally used. The reaction time used in the formation of the preferred copolymers and terpolymers depends in general upon the reaction temperatures used. Generally, reaction times can vary from about 5 minutes to about 4 weeks; however, it is more usual to use reaction times ranging from about 0.25 to 100 hours.

The reaction vessel can be constructed of any material that is inert to the reactants and diluents used, and is capable of withstanding the operating pressures. Reaction vessels made of glass, stainless steel and glass-lined steel are satisfactory.

In a typical polymerization procedure, a glass reaction vessel is charged with benzene and a catalytic amount of triphenylmethyl hexachloroantimonate. To this mixture of catalyst and solvent is then introduced a monomer mixture consisting of tetrahydrofuran (e.g. 300 parts by weight and cyclododecadiene monoepoxide (e.g. 25 parts by weight). The glass reaction vesel containing the reaction mixture is then sealed and placed in a constant temperature bath, maintained at a temperature ranging from −30° to +30° C. The reaction vessel and its contents are continuously tumbled or otherwise agitated in the constant temperature bath during the period of reaction. Polymer isolation and catalyst removal can be achieved utilizing a variety of techniques. In one procedure, the polymer solution is introduced into excess non-solvent such as methanol or water to precipitate the polymer. Prior to precipitation, the polymer solution can be washed with aqueous acid or base to effectively remove and deactivate catalyst residues. If desired, additives and stabilizers may be introduced into the polymer solution prior to precipitation. An especially attractive finishing process involves the introduction of the polymer solution into a body of hot water containing acidic or basic deashing agents and any desired additives or stabilizers.

The polymer products exhibit intrinsic viscosities ranging from about 0.05 to 5.0 as determined in benzene at a temperature of 25° C. at a polymer concentartion of from 0.05 to 0.50 gram of polymer per 100 cc. of solution and are soluble in tetrahydrofuran, benzene, chloroform, toluene, cyclohexane, and methylene chloride.

The polymers of this invention can be designed for different end uses. The high molecular weight polymers are highly useful elastomers having outstanding properties (e.g. tensile strength, modulus, resiliency, etc.), and are readily curable in a short period of time with sulfur and accelerators such as 2-benzothiazyl disulfide, mercaptobenzothiazole, cyclohexyl - 2 - benzothiazyl sulfenamide, tellurium diethyl dithiocarbomate, etc. Carbon blacks such as the channel blacks, furnace blacks and thermal blacks and/or mineral fillers such as the oxides, hydroxides, carbonates, etc. of silicon, aluminum, magnesium, titanium, calcium, or the silicates or aluminates of these elements may be compounded with the elastomeric products of the present invention. In addition, the elastomers of the present invention can be co-vulcanized with other well-known rubbers, e.g. butyl, neoprene, chlorobutyl, etc. to provide highly useful rubbery compositions.

Depending on the choice and amounts of comonomer the instant polymers may be thermoplastic in form. Such polymers may be molded and pressed or cast into films. Lower molecular weight products of this type are especially useful as components in solventless varnish and paint formulations although the higher molecular weight products can be used for these applications providing a solvent is present. The instant polymer products air-dry to a hard, tack-free surface and when elastomeric in form may be utilized in the preparation of tires, inner tubes, hose and tubing, wire and cable coatings, mechanical goods, as well as for a wide variety of coated and molded articles.

This invention and its advantages will be better understood by reference to the following examples:

Example 1

Attempts were made to determine whether cyclododecadiene monoepoxide would copolymerize with propylene oxide. Since the carbonium ion salts used to polymerize tetrahydrofuran do not give high molecular weight polymers of propylene oxide, the zinc diethyl-water catalyst system was employed for these experiments.

Polymerization experiments were carried out with 50 ml. portions of propylene oxide diluted with 12.5 ml. of benzene. Either allyl glycidyl ether or cyclododecadiene monoepoxide was added in each experiment as shown in Table I. Thirteen millimoles of zinc diethyl was used as catalyst in each experiment with water was used as the cocatalyst. Polymerization was carried out at 50° C. for 19 hours after which time the polymers were isolated by precipitation into boiling water, isolated and dried. The polymers were then separately compounded in the recipe (parts by weight): polymer 100, phenyl-beta-naphthylamine 2, stearic acid 2, zinc oxide 10, SPF black 35, sulfur 5, mercaptobenzothiazole 2, and tetramethylthiuram disulfide 2; the compounded samples were then vulcanized at 307° F. for 60 minutes. To test whether vulcanization had taken place, these samples were then immersed in benzene. As summarized in Table I, vulcanization had occurred when the samples did not dissolve but merely swelled. A lack of vulcanization was shown when the specimen dissolved.

The data in Table I show that the alicyclic olefin monoepoxide—cyclododecadiene monoepoxide—did not copolymerize with the saturated epoxide—propylene oxide—using a catalyst which readily produced copolymers of an acyclic olefin monoepoxide—allyl glycidyl ether—with propylene oxide. These data thus indicate that there is no assurance of equivalence between alicyclic olefin monoepoxides and acyclic olefin monoepoxides. Moreover, the saturated monoepoxide—propylene oxide and tetrahydrofuran—have similar structures and are known in the prior art to behave in an equivalent manner. However, the data in Table I show that cyclododecadiene monoepoxide will not copolymerize with propylene oxide and therefore it would be expected that cyodododecadiene monoepoxide would also not copolymerize with tetrahydrofuran. Nevertheless, the succeeding examples clearly show that a copolymer of cyclododecadiene monoepoxide with tetrahydrofuran can be readily prepared.

TABLE I

| Sample | A | B | C | D | E | F | G |
|---|---|---|---|---|---|---|---|
| Mole percent AGE* in Feed | 6.0 | 3.6 | 2.7 | | | | |
| Mole percent Cyclododecadiene monoepoxide in Feed | | | | 6.0 | 3.6 | 2.7 | 3.6 |
| Ratio of Water Cocatalyst to ZnEt$_2$ | 0.8 | 0.8 | 0.8 | 0.8 | 0.8 | 0.8 | 0.8 |
| Yield of Polymer, g | 39 | 36 | 39 | 42 | 30 | 39 | 19 |
| Vulcanization | Yes | Yes | Yes | No | No | No | No |

*Allyl glycidylether.

Example 2

Cyclododecadiene monoepoxide was prepared by reacting cyclododecatriene with hydrogen peroxide in the presence of formic acid as described in U.S. Patent 2,978,464 issued Apr. 4, 1961 to H. K. Wiese et al. In a dry box, a mixture was made of 300 ml. of freshly distilled tetrahydrofuran and 25 ml. of the cyclododecadiene monoepoxide (B.P. of 96–97° C., at 1.6 mm. Hg); this corresponded to a monomer mixture containing 3.7 mole percent of the cyclododecadiene monoepoxide. The monomer mixture was then added to 0.25 g. of triphenylmethyl hexachloroantimonate ($Ph_3C^+SbCl_6^-$). Immediately after mixing the polymerization container was transferred to a low temperature enclosure maintained at −5° C. Polymerization was allowed to proceed for an arbitrary period of 11 days at this temperature. The viscous polymer solution was then precipitated into 3 liters of methanol in which 3 g. of 2,6-di-tert-butyl-4-methylphenol had been dissolved. The precipitated polymer was then dissolved in benzene and this solution slowly added to a large volume of boiling water. The rubbery polymer was then collected and dried in vacuo to yield 107 g. of copolymer. The solution viscosity of the material was measured in benzene solution at a concentration of 0.1214 g./dl. and an inherent viscosity value of 1.16 was obtained. The iodine number of the copolymer was obtained in duplicate and gave values of 20.3 and 20.9 cg. $I_2$/g. copolymer. This corresponds to 3.0 to 3.1 mole percent of cyclododecadiene monoepoxide residues in the copolymer.

Example 3

A monomer and solvent mixture was prepared from 554 ml. of tetrahydrofuran (THF), 36 ml. of allyl glycidyl ether (AGE) and 150 ml. of toluene. This corresponds to 4.3 mole percent AGE in the THF-AGE mixture. This solution was added to 0.90 g. of triphenylmethyl hexachloroantimonate and polymerization was allowed to proceed at −13° C. for an arbitrary period of 4 days. After this time, the reaction mixture was diluted with benzene containing 0.2 g. of 2,6-di-tert-butyl-4-methyl phenol and precipitated into a large volume of methanol. The copolymer was dissolved in benzene, washed with dilute acid, then water until the washings were neutral, and finally precipitated into excess methanol. After drying, 249 g. of copolymer was obtained which had an inherent viscosity of 1.12 when measured in benzene at 25° C. at a concentration of 0.1009 g./dl. The AGE content of the copolymer was determined by infrared analysis of a $CS_2$ solution. This test showed that the copolymer contained 3.0 moles percent AGE residues.

Example 4

The copolymers of Examples 2 and 3 were compounded as follows (all parts by weight): copolymer 100, low structure HAF carbon black 50, stearic acid 1, N-phenyl-2-naphthylamine 0.5, zinc oxide 5, sulfur 2, and tellurium diethyldithiocarbamate 1.5. The copolymers of Examples 2 and 3 were each separately compounded in this recipe. The compound of the copolymer of Example 2 was vulcanized at 307° F. for 30 minutes, the compound of the copolymer of Example 3 for 40 minutes. These vulcanization conditions were chosen to give vulcanizates from both rubbers with similar physical properties. The physical properties of the vulcanization obtained are shown in Table II. Test samples for the Goodrich Flexometer test were also prepared, adding 5 minutes to the cure times originally indicated. The test was carried out at 100° C., at a load of 30 pounds and a stroke of ⅛ inch for 0.5 hour.

TABLE II

| Property | Example 2 Copolymer Compound | Example 3 Copolymer Compound |
|---|---|---|
| Tensile strength, p.s.i. | 3,725 | 3,840 |
| Elongation, percent | 560 | 605 |
| Modulus/300% | 1,865 | 1,772 |
| Shore A Hardness | 75 | 75 |
| Static compression, percent | 9.7 | 9.9 |
| Initial dynamic compression, percent | 2.5 | 5.5 |
| Drift, percent | 13.1 | 29.2 |
| Set, percent | 17.1 | 35.3 |
| Temperature rise, °C | 32.5 | 49.5 |
| Pellet condition | Solid | Solid |

The results show that the copolymer of Example 2 made with the cyclododecadiene monoepoxide has substantially better dynamic properties than the copolymer of Example 3 with the allyl glycidyl ether in view of the lower percent drift, percent set and temperature rise of the Example 2 copolymer compound as compared to the Example 3 copolymer compound.

Example 5

Compounds were formulated from the rubbery copolymers of Examples 2 and 3 in the recipe given in Example 4. Pads were then cured at 307° F. for various lengths of time. The vulcanized samples were then swollen in benzene and the equilibrium volume swell then determined. The tighter the vulcanization network, the lower the volume swell. The following results were obtained:

TABLE III

| | Volume Swell, Percent | |
|---|---|---|
| Cure Time at 307° F., Minutes | Example 2 Copolymer Compound | Example 3 Copolymer Compound |
| 20 | 458 | 634 |
| 30 | 416 | 493 |
| 45 | 396 | 440 |
| 60 | 383 | 430 |
| 90 | 390 | 420 |

The results in Table III indicate that the rate of vulcanization is higher for the rubbery copolymer of Example 2 (THF+cyclododecadiene monoepoxide) than that of Example 3 (THF+AGE) thus pointing out the advantages of diolefinic residues in the copolymer.

Example 6

By suitable adjustment of monomer feed mixtures and polymerization conditions, copolymers of tetrahydrofuran and epoxycyclododecadiene of varied composition can be prepared. Some experiments of this type are shown in Table IV. In each of these experiments 30 mg. of triphenyl carbonium hexachloroantimonate was used as initiator and polymerization was allowed to proceed for an arbitrary period of 92 hours. The isolated polymeric products were either rubbery polymers or viscous oils.

TABLE IV

| Run | A | B | C | D | E | F | G | H |
|---|---|---|---|---|---|---|---|---|
| Ml. THF | 7.5 | 5.0 | 2.5 | 0.5 | 7.5 | 5.0 | 2.5 | 0.5 |
| Ml. cyclododecadiene monoepoxide | 2.5 | 5.0 | 7.5 | 10.0 | 2.5 | 5.0 | 7.5 | 10.0 |
| Polymerization, temp. °C | −10 | −10 | −10 | −10 | 25 | 25 | 25 | 25 |
| Reaction time, hrs | 92 | 92 | 92 | 92 | 92 | 92 | 92 | 92 |
| Polymer yield, g | 3.6 | 4.8 | 6.4 | 5.5 | 3.0 | 5.0 | 6.8 | 6.4 |
| Index of refraction, 20° | | 1.508 | 1.510 | 1.509 | 1.497 | 1.507 | 1.508 | 1.509 |
| Inherent viscosity, benzene 21° C | 0.25 | | | | | | | |

Example 7

Polymerization experiments were carried out by mixing 5 ml. of THF, 5 ml. of 3,3-bis-(chloromethyl) oxacyclobutane and 1 ml. of cyclododecadiene monoepoxide. The mixed monomers were then added to 30 mg. triphenyl carbonium hexachloroantimonate. Two such charges were prepared and one allowed to polymerize at 25° C. the other at −10° C. both for 92 hours. The first experiment yielded 2.9 g. of terpolymer with an inherent viscosity of 0.15; the second experiment (at −10° C.) gave 4.2 g. of terpolymer with an inherent viscosity of 0.36.

Example 8

Tetrahydrofuran (150 ml.) and dicyclopentadiene monoepoxide (5.5 g.) were mixed to form a monomer feed mixture containing 2 mole percent of dicyclopentadiene monoepoxide. The monomer mixture was added to 0.125 g. of triphenylmethyl hexachloroantimonate and the reactants were stirred in a polymerization container maintained at −10° C., for 90 hours. The copolymer was then isolated by precipitation into 2 liters of methanol containing 0.5 ml. of reagent grade ammonia. After decantation and drying in vacuo, 25. 3 g. of copolymer was obtained. The copolymer had an inherent viscosity of 1.09 (measured in benzene at 25° C.) and an iodine number of 5.9 cg. I$_2$/g. thus indicating that a copolymer consisting of 1.8 mole percent dicyclopentadiene monoepoxide resides and 98.2 mole percent tetrahydrofuran residues had been obtained.

Further advantages of this invention will be apparent to those skilled in the art. It is to be understood that this invention is not limited to the specific examples set forth herein, which have been offered merely as illustrations, and that modifications may be made without departing from the spirit and scope of the appended claims.

What is claimed is:

1. A polymer comprising 60 to 99 mole percent of tetrahydrofuran polymerized with 40 to 1 mole percent of a monomer system selected from the group consisting of an alicyclic olefinic monoepoxide and a mixture of said alicyclic olefinic monoepoxide with a saturated monoepoxide having at least 3 carbon atoms, said polymer having an intrinsic viscosity in the range of about 0.05 to 5.0 as determined in benzene at a temperature of about 25° C. and a polymer concentration from about 0.05 to 0.50 g. of polymer per 100 cc. of solution.

2. The polymer of claim 1 wherein the alicyclic olefinic monoepoxide is selected from the group consisting of fused ring olefinic monoepoxides and diolefinic monoepoxides.

3. The polymer of claim 2 wherein the alicyclic olefinic-monoepoxide is selected from the group consisting of dicyclopentadiene monoepoxide, tetrahydroindene monoepoxide and cyclododecadiene monoepoxide.

4. The polymer of claim 1 wherein the monomer system is a mixture of an alicyclic olefinic monoepoxide with a saturated monoepoxide, said monoepoxide being selected from the group consisting of propylene oxide, 3,3-bis-(chloromethyl) oxacyclobutane and epichlorohydrin.

5. The polymer of claim 1 sulfur-cured to an elastomeric vulcanizate.

6. The polymer of claim 1 which contains 90 to 99 mole percent tetrahydrofuran residues and 10 to 1 mole percent cyclododecadiene monoepoxide residues.

References Cited

UNITED STATES PATENTS 3,230,202  1/1966  Tinsley et al. _____ 260—78.5
3,354,133  11/1967  Hsieh _____ 260—88.3

FOREIGN PATENTS 898,269  4/1945  France.
834,158  3/1958  Great Britain.
1,120,139  12/1961  Germany.

OTHER REFERENCES

Ali, in Die Makromolekulure Chemie 84: 117–125 (1965) (in English).

Bawn, in Polymer 6 (1): 95–98 (London, 1965).

Tyndvig et al., Chemical Abstracts 62: 14,829 h (1962).

JOSEPH L. SCHOFER, *Primary Examiner.*

J. C. HAIGHT, *Assistant Examiner.*

U.S. Cl. X.R.

260—88.3